United States Patent [19]

Fizyta et al.

[11] Patent Number: 4,516,288
[45] Date of Patent: May 14, 1985

[54] WINDSHIELD WASHER DUAL SPRAY NOZZLE

[75] Inventors: Wojciech L. Fizyta, Livonia; Algen K. Kaumeheiwa, Southfield, both of Mich.

[73] Assignee: Chrysler Corporation, Highland Park, Mich.

[21] Appl. No.: 607,897

[22] Filed: May 7, 1984

[51] Int. Cl.³ ................................................ B60S 1/46
[52] U.S. Cl. .............................. 15/250.04; 239/284 R; 239/522
[58] Field of Search ................ 15/250, 250.01, 250.02, 15/250.03, 250.04, 250.35, 250.22, 250.2, 250.06; 239/284 R, 284 A, 518, 521, 522

[56] References Cited

U.S. PATENT DOCUMENTS

| | | | |
|---|---|---|---|
| 1,507,350 | 9/1924 | Franzen | 239/522 |
| 2,812,980 | 11/1957 | Kadosch et al. | 239/522 X |
| 3,790,083 | 2/1974 | Redifer | 15/250.04 X |
| 3,793,670 | 2/1974 | Riester et al. | 15/250.04 |

Primary Examiner—Peter Feldman
Attorney, Agent, or Firm—Edward P. Barthel

[57] ABSTRACT

A improved windshield wiper cleaning system spray nozzle mounted on the wiper arm intermediate the ends of the wiper blade. The nozzle includes a first baffle surface disposed at an obtuse angle relative to a base surface and at an acute angle relative to a transverse frontal wall surface upstanding from the base surface. A fluid dispensing orifice extends through the transverse wall with its axis normal to the frontal wall surface. Secondary baffle surfaces are provided by means of a notched-out portion formed in the first baffle surface. The orifice directs a stream of fluid such that a primary spray of the fluid is dispersed to upper and intermediate bladed areas of the windshield and a secondary spray of fluid is dispersed normal to the lower bladed area of the windshield.

3 Claims, 4 Drawing Figures

U.S. Patent  May 14, 1985  4,516,288
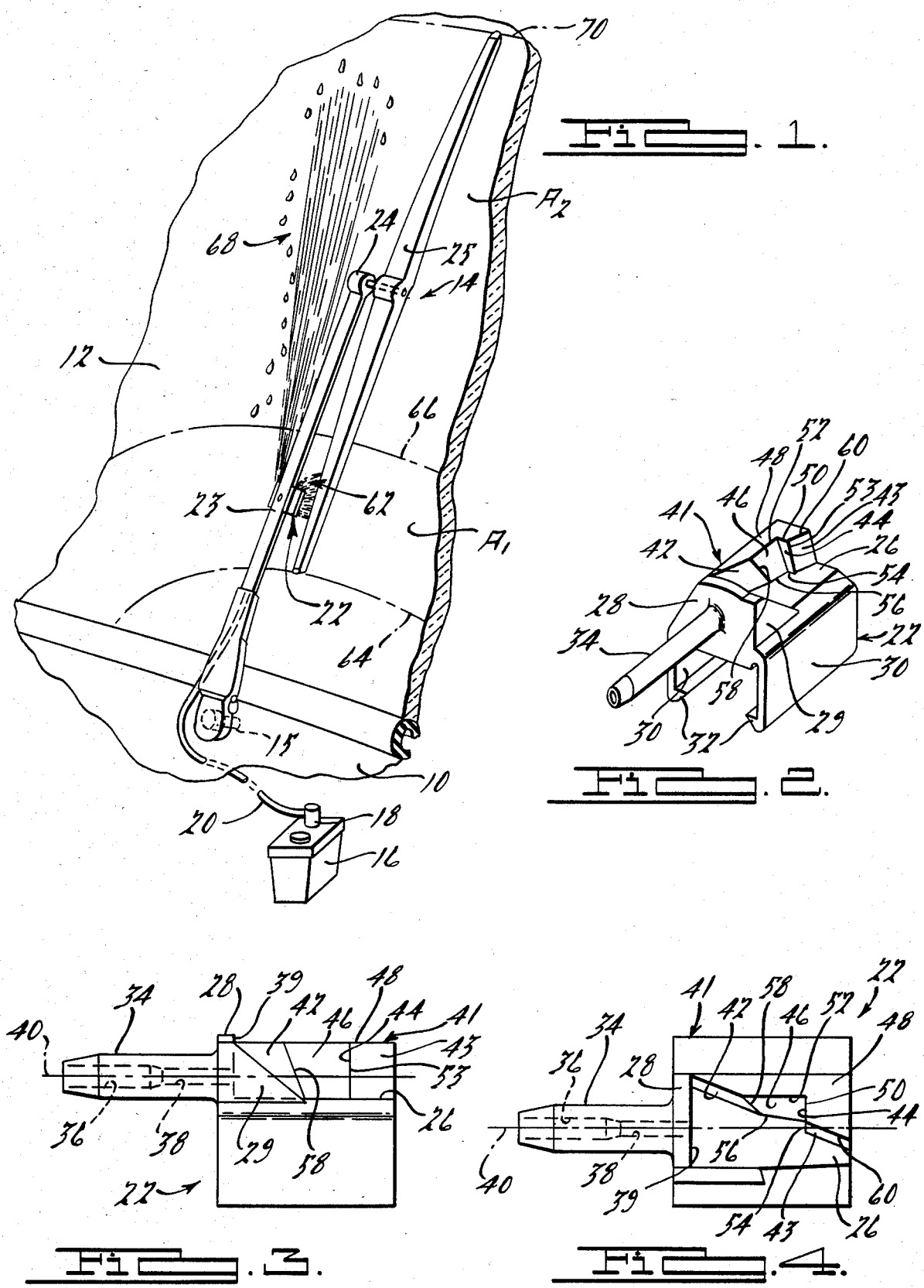

WINDSHIELD WASHER DUAL SPRAY NOZZLE

BACKGROUND OF THE INVENTION

This invention relates to a windshield washer nozzle and more particularly to an improved arm carried nozzle having dual spray patterns.

The U.S. Pat. No. 3,793,670 to Riester et al discloses a windshield washer assembly having a nozzle for positively directing and dispersing fluid under pressure toward the surface of a windshield. The Riester et al nozzle has a baffle projecting therefrom at a compound angle contoured to direct fluid toward the windshield and an orifice disposed to project fluid under pressure therethrough against the baffle. The baffle serves to break up the stream into small particles and disperses the fluid into a single broad spray directed toward the windshield.

SUMMARY OF THE INVENTION

In certain vehicle installations it has been determined that a nozzle providing a single broad spray was insufficient to cover the entire wiped area of the windshield under all driving conditions. With the nozzle attached to the wiper arm adjacent the bottom edge of the blade a single spray nozzle failed to adequately apply fluid to the lower part of the windshield satisfactorily cover the uppermost blade sweep regions. This coverage problem becomes more pronounced during increased air flow conditions. Thus, during high head winds, for example, it is possible that the lower bladed area may be inadequately covered with fluid from a single spray nozzle.

The present invention contemplates elimination of this problem which is inherent in prior-art single spray pattern nozzles. Applicants' improved dual spray nozzle provides a secondary spray directed normal to the windshield by means of a unique notched-out portion formed in the primary baffle surface of the Riester et al nozzle.

It is, therefore, an object of this invention to provide an improved dual spray nozzle positioned to direct a primary spray of fluid on the upper and intermediate windshield sweep areas and a seconary spray of fluid on the lower windshield sweep area. Other objects and advantages of this invention will be made apparent as the description progresses.

BRIEF DESCRIPTION OF THE DRAWINGS

In the accompanying drawings in which one of various possible embodiments is illustrated, FIG. 1 is a fragmentary perspective view of a portion of a motor vehicle windshield embodying the invention:

FIG. 2 is a perspective view of the improved nozzle of the invention;

FIG. 3 is a side elevational view of the improved nozzle; and

FIG. 4 is a bottom elevational view of the impoved nozzle.

DETAILED DESCRIPTION OF THE INVENTION

In FIG. 1 the windshield area of a motor vehicle is partially shown having a hood portion 10 and a windshield 12. A wiper arm and blade assembly 14 is mounted on a pivot shaft 15 for oscillatory wiping movement in an arcuate path across the outer surface of the windshield. A reservoir 16, shown mounted within the vehicle engine compartment, includes a suitable pump 18. The pump outlet is connected through a flexible conduit 20 to nozzle 22 mounted on arm 23 of the wiper assembly 14.

The wiper arm 23 is secured to the pivot shaft 15 at its lower end and to pivot block 24 at its upper end. The conduit 20 extends beneath the arm 23 and is secured thereto by lanced out portions (not shown). A wiper blade 25 is pivotally connected to the block 24 intermediate the blades free end.

As seen in FIGS. 2, 3 and 4, the nozzle 22 comprises base surface 26 having a first transverse wall 28 upstanding therefrom. A base support web 29 extends from one end of the wall 28. Projecting from the edges of the opposite surface of the base are a pair of legs 30 having inwardly extending lugs 32. The legs 30 and lugs 32 provide clamping means for securing the nozzle to the arm 23, as shown in the abovementioned Riester et al U.S. Pat. No. 3,793,670.

The transverse wall 28 supports an integral nipple 34 shown with an axial bore 36 terminating in a reduced orifice 38 in frontal surface 39 of the wall 28. The frontal surface 39 extends in a transverse plane substantially normal to the base surface 26. Thus, it will be noted that the principal axes 40 of the orifice 38 is oriented substantially parallel to the base surface 26 and normal to the frontal wall surface 39.

A second wall 41 projects upwardly from the base surface 26 and extends longitudinally from the other end of the transverse wall 28. The second wall 41 has a first deflecting surface or baffle means disposed at an obtuse angle relative to the base 26. That is, the first deflecting surface means, as set forth in the Pat. No. 3,793,670, lies in a plane at a compound angle to the base 26 extending obliquely with respect to the base and sloping outwardly therefrom. Also, as seen in FIG. 4, the plane of the deflecting surface means is disposed at an acute angle to the transverse wall surface 39 to intersect the path of a stream of fluid or solvent discharged from the orifice 38.

Applicant's unique improvement to the Riester et al nozzle involves forming a notched-out portion in the first deflecting surface means separating it into fore and aft deflecting surfaces 42 and 43. The surface 42 is proximate the orifice 38 while the surface 43 is distal therefrom. The notched-out portion, shown in FIG. 2, provides a second transverse deflecting surface 44 and a third deflecting surface 46 located in a skewed plane with respect to the axis 40. It will be noted in FIG. 4 that the transverse deflecting surface 44 is oriented substantially normal to the base surface 26 and parallel to the frontal surface 39. Also, the third skewed deflecting surface 46 is oriented to intersect the fore 42 and the transverse 44 deflecting surfaces.

The planes of the second 44 and third 46 intersecting surfaces are oriented to intersect second wall upper surface 48. The upper surface 48 is substantially parallel to base surface 26 such that the surface 44 upper edge 50 and surface 46 upper edge 52 intersect to define a right angle as seen in FIGS. 2 and 4. It will be seen in FIG. 4 that the edge 52 is parallel to the orifice principal axis 40. Also, the deflecting surface 44 and the aft deflecting surface 43 intersect to define leading linear edge 53. The linear edge 53 has its upper and lower ends determined by surfaces 48 and 26, respectively.

As seen in FIG. 2, the second 44 and third 46 deflecting surfaces intersect the base surface 26 at lower interior corner defining linear elements 54 and 56, respectively. FIG. 4 shows the linear elements 54 and 56 establish an obtuse angle of about 115°. The skewed third deflecting surface 46 is shown in FIG. 3 intersecting the first deflecting surface 42 at linear edge 58.

In FIG. 4 it will be noted that a distal diagonal edge 60 is defined by the distal deflecting surface 43 and the wall upper surface 48. A projection of the vertical plane containing the orifice axis 40 intersects the linear edge 53 about midway between its upper and lower ends. As a result the transverse surface 44 and skewed surface 46 are positioned to intercept a secondary portion of the fluid stream exiting from the orifice 38. The notched-out portion, defined by surfaces 44 and 46, functions to create a relatively small secondary spray indicated at 62 in FIG. 1. The spray 62 is directed generally normal to the plane of the windshield 12. The spray 62 thus impinges on lower wiped portion or area A2 of the windshield located substantially between an arcuate pair of dashed lines 64 and 66. The dashed lines define the bladed sweep area A2 of the lower one-quarter sweep length of the blade 25.

In FIG. 1 it will be seen that the base surface 26 and the pair of first deflecting surfaces 42 and 43 function to direct a major or primary spray 68 generally parallel to the plane of the windshield 12. The spray 68 covers upper and intermediate wiped portions of the windshield. The upper and intermediate portions are defined by the blade sweep area A2. The area A2 is substantially between the pair of arcuate dashed lines 66 and 70 wiped by the upper three quarter sweep length of the blade.

The location of the nozzle 22 on arm 23 relative to the blade is an important feature of the present invention. As shown in FIG. 1 the nozzle 22 is positioned a defined distance above the lower end of the blade 25 such that it is substantially intermediate the lines 64 and 66 defining the area A1. In this way the secondary spray 62 covers the area A1 with fluid to insure proper cleaning thereof.

Thus, an improved dual spray nozzle is provided that is attached to the wiper arm intermediate the windshield area A1. As a result the primary broad spray 68 covers the upper and intermediate bladed area A2 of the windshield. The secondary spray 62 covers the lower bladed area A1 of the windshield. In this manner the dual spray nozzle insures complete coverage of the bladed sweep areas during all driving speeds and airflow conditions.

Although only one embodiment of the invention has been disclosed and described, it is apparent that other embodiments and modifications of the invention are possible.

What is claimed is:

1. A vehicle windshield cleaning assembly including a wiper blade oscillatable through an arcuate path across the outer surface of the windshield to wipe upper, intermediate, and lower areas of the same, a washer nozzle mounted on said windshield cleaning assembly and movable therewith, said washer nozzle comprising a base having an uninterrupted surface, a first solid wall upstanding from said base having a transverse frontal wall surface extending vertically from said base surface, an orifice extending through said frontal wall surface such that the principal axis of said orifice is normal to said frontal wall surface, means for supplying fluid under pressure to said orifice for discharge therefrom, a second longitudinally extending wall upstanding from said base surface disposed substantially perpendicular to said first wall, said second wall having its upper surface parallel with said base surface, said second wall forming first deflecting surface means disposed in a plane oriented at an obtuse angle relative to said base and an acute angle relative to said first solid wall intersecting the path of a stream of solvent discharged from said orifice, and means for supplying a solvent under pressure to said orifice, the improvement wherein said first deflecting surface means having a notched-out portion therein defining a second transverse deflecting surface and a third skewed deflecting surface, said first deflecting surface means in the form of a pair of fore and aft coplanar deflecting surfaces on either side of said notched-out portion such that said fore and aft surfaces are located proximate and distal respectively, from said orifice, said third skewed deflecting surface intersecting said fore and said transverse deflecting surfaces, whereby said fore and aft deflecting surfaces intersecting and diverting a primary spray of said stream of fluid generally axially upwardly toward said upper and intermediate areas of the windshield and said second and third surfaces intersecting and dispersing a secondary spray said stream of fluid generally normally toward said lower area of the windshield.

2. The cleaning assembly as set forth in claim 1, wherein said nozzle is positioned on said assembly such that said secondary spray is directed on said windshield a predetermined distance above the lower edge of said blade intermediate said windshield lower wiped area.

3. A vehicle windshield cleaning assembly including an arm having a pivot below one side of the windshield, said arm effective, when actuated to oscillate a blade through an arcuate path across the outer surface of the windshield to wipe upper, intermediate, and lower areas of the same, a washer nozzle mounted on said arm a predetermined distance above the lower edge of said blade and movable therewith, said washer nozzle comprising a base having an uninterrupted surface, a first solid wall upstanding from said base having a transverse frontal wall surface extending vertically from said base surface, an orifice extending through said frontal wall surface such that the principal axis of said orifice is normal to said frontal wall surface, means for supplying fluid under pressure to said orifice for discharge therefrom, a second longitudinally extending wall upstanding from said base surface disposed substantially perpendicular to said first wall, said second wall having its upper surface parallel with said base surface, said second wall forming first deflecting surface means disposed in a plane oriented at an obtuse angle relative to said base and an acute angle relative to said first solid wall intersecting the path of a stream of solvent discharged from said orifice, and means for supplying a solvent under pressure to said orifice, the improvement wherein said first deflecting surface means formed with a notched-out portion defining a second transverse deflecting surface and a third skewed deflecting surface, said second surface extending normal from said base surface and parallel to said frontal wall surface, the planes of said second and third surfaces oriented to intersect said second wall upper surface defining a pair of upper right angle line elements, wherein the upper line element of said third surface is substantially parallel with said orifice principal axis, and said second and third surfaces intersecting said base surface at lower line elements defining an obtuse angle, said first deflecting surface means in the form of a pair of fore and aft coplanar deflecting surfaces on either side of said notched out portion such that said fore and aft surfaces are located proximate and distal respectively, from said orifice, the intersection of said second surface and said aft surface defining a leading linear edge of said aft surface, such that the prolongation of a vertical plane containing said orifice principal axis intersecting said leading linear edge about midway between its upper and lower ends, whereby said fore and aft surfaces intersecting and diverting a primary spray of fluid toward the upper and intermediate areas of the windshield swept by said wiper blade and said second and third surfaces intersecting and dispersing a secondary spray of fluid generally normally toward said lower area of the windshield.

* * * * *